United States Patent
Heym

(10) Patent No.: US 7,880,636 B2
(45) Date of Patent: Feb. 1, 2011

(54) INFORMATION DISPLAY SYSTEM FOR AIRCRAFT

(75) Inventor: Detlef Heym, Achim (DE)

(73) Assignee: Airbus Deutschland GmbH (DE)

( * ) Notice: Subject to any disclaimer, the term of this patent is extended or adjusted under 35 U.S.C. 154(b) by 422 days.

(21) Appl. No.: 11/571,513

(22) PCT Filed: Jun. 27, 2005

(86) PCT No.: PCT/EP2005/006903

§ 371 (c)(1), (2), (4) Date: May 16, 2007

(87) PCT Pub. No.: WO2006/002852

PCT Pub. Date: Jan. 12, 2006

(65) Prior Publication Data

US 2008/0012728 A1 Jan. 17, 2008

Related U.S. Application Data

(60) Provisional application No. 60/584,418, filed on Jun. 30, 2004.

(30) Foreign Application Priority Data

Jun. 30, 2004 (DE) .................. 10 2004 031 700

(51) Int. Cl.
*G08B 5/22* (2006.01)
(52) U.S. Cl. .................. 340/815.45; 340/945; 340/971; 340/691.1; 362/471
(58) Field of Classification Search .................. 340/945, 340/971, 286.05, 963; 353/119, 71; 362/471
See application file for complete search history.

(56) References Cited

U.S. PATENT DOCUMENTS 4,193,666 A * 3/1980 Cojan .......................... 340/971
5,459,539 A 10/1995 Yamamoto .................. 353/119
5,673,963 A * 10/1997 Pietzsch ................. 296/190.01

(Continued)

FOREIGN PATENT DOCUMENTS

DE 693 17 250 9/1998

(Continued)

OTHER PUBLICATIONS

German Office Action dated Apr. 12, 2007 in German Patent Application 10 2004 031 700.3-22.

(Continued)

*Primary Examiner*—Anh V La
(74) *Attorney, Agent, or Firm*—Ostrolenk Faber LLP

(57) ABSTRACT

In current passenger aircraft, signs are used to represent specific information, which reproduce the information as writing or a pictogram. According to one exemplary embodiment of the present invention, an information display system for aircraft is specified, comprising a light source, a projection unit, and a housing. For this purpose, according to one exemplary embodiment of the present invention, the projection unit is implemented in the form of a liquid crystal display, so that, in combination with a high-performance light-emitting diode and a suitable lens, static and dynamic information may be presented on arbitrarily shaped projection surfaces. The flexibility of the onboard information display is thus advantageously increased.

13 Claims, 3 Drawing Sheets

U.S. PATENT DOCUMENTS

| | | | |
|---|---|---|---|
| 5,993,012 A | 11/1999 | Buchanan et al. | 353/119 |
| 2001/0026216 A1 | 10/2001 | Block | 340/425.5 |
| 2004/0085484 A1 | 5/2004 | Soper et al. | 348/836 |
| 2005/0052339 A1* | 3/2005 | Sprague | 345/1.1 |

FOREIGN PATENT DOCUMENTS

| | | |
|---|---|---|
| DE | 199 25 318 | 2/2001 |
| EP | 0 605 232 | 7/1994 |
| EP | 0 888 016 | 12/1998 |
| EP | 1 398 659 A2 | 3/2004 |
| JP | 2003556 | 1/1990 |
| JP | 5161521 | 6/1993 |
| JP | 11305334 | 11/1999 |
| WO | WO 2005/056385 | 6/2005 |

OTHER PUBLICATIONS

German Office Action dated Apr. 1, 2008 in German Patent Application 10 2004 031 700.3-22.

PCT/EP2005/006903 International Search Report dated Jun. 7, 2006.

* cited by examiner

INFORMATION DISPLAY SYSTEM FOR AIRCRAFT

CROSS REFERENCE TO RELATED APPLICATION

This application claims the benefit of the filing date of U.S. Provisional Patent Application No. 60/584,418, filed Jun. 30, 2004, German Patent Application No. 10 2004 031 700.3, filed Jun. 30, 2004, and PCT International Patent Application No. PCT/EP2005/006903, filed Jun. 27, 2005, the disclosures of which are hereby incorporated by reference.

FIELD OF THE INVENTION

The present invention relates to information displays in aircraft. In particular, the present invention relates to an information display system for aircraft, an aircraft comprising an information display system, and the use of a corresponding information display system in an aircraft.

TECHNOLOGICAL BACKGROUND

In current passenger aircraft, signs are used to represent specific information, which reproduce the information as writing or in the form of a pictogram. These are, for example, signs or illuminated panels for reproducing commands or warning notices, such as "no smoking" or "fasten seatbelt". These signs have the disadvantage that the information reproduced thereon may not be changed and is always present.

Furthermore, installation and/or attachment of the information reproduction devices or signs is necessary, which is not possible on any arbitrary surface, since it may be curved or, for example, the space behind it may be insufficient for a corresponding installation. After installation and/or attachment, the signs are essentially permanently fixed and often may only be observed from defined positions, such as from the passenger seat, but not from the aisle, or vice versa. This may result in some signs not being recognized in specific situations, for example, during boarding.

SUMMARY OF THE INVENTION

According to an exemplary embodiment of the present invention, an information display unit for aircraft may be provided, the information display unit comprising a light source, an at least partially light-transparent projector, and a housing, the light source being positioned behind the projector within the housing and at least partially shining through the projector, so that the light transmitted through the projector is projectable onto a projection surface.

Through the design of the information display unit or information display system according to the present invention, the information to be displayed may be projected easily and variably onto a wall or other surfaces. Curved surfaces are thus also usable for the display. Furthermore, even those surfaces which are not suitable for attaching signs or monitors because of a lack of stability, for example, or because there is insufficient space behind the surfaces, for example, to attach corresponding illumination means for the illuminated panels or the housing bodies of the monitors which are used as display means, may also be used for display.

Furthermore, after the information display system is turned off, no traces of the information display may remain on the projection surface.

Thus, an information display unit for aircraft may be provided, which allows simple and variable reproduction of information.

According to a further exemplary embodiment of the present invention, the light source comprises a light-emitting diode and the projector comprises a liquid crystal display. An information system which is distinguished by an extremely compact construction is advantageously specified through the combination of a high-performance LED and a miniature LCD. In this way, it is possible to install the projector, which comprises light-emitting diode, liquid crystal display, and housing, in a space-saving way and therefore provide an information display unit which may be installed largely covered and does not have a disturbing effect on the user after being turned off. By using a high-performance LED, an extremely strong and, at the same time, very compact and energy-saving light source is provided, which is further distinguished by a high service life. The corresponding projections may be varied or replaced by the liquid crystal display as the projection means. High flexibility is therefore ensured. Alternatively, according to further exemplary embodiments, the projection means may be designed using a slide, a coated glass plate, or a stamped-out film or metal plate. A gobo may also be used.

According to a further exemplary embodiment of the present invention, the information display unit also has at least one component selected from the group comprising a collimator, a diffuser, a scattering plate, a radiation filter, and a projection lens.

Thus, uniform illumination of the projection means with the aid of a diffuser may be provided, which uniformly distributes the light bundled by the collimator diffusely onto the projection means.

According to a further exemplary embodiment of the present invention, the information display unit comprises a dataport, via which the information display unit may be activated from the outside. Therefore, the information display unit may be operated from an external control console, for example.

According to a further advantageous exemplary embodiment of the present invention, projection data may be transferred to the information display unit via the dataport, the projection of the transmitted light on the projection surface being controllable via the transferred projection data.

Therefore, corresponding control commands may be output externally to the information display unit, which then result in a corresponding information display. Therefore, for example, the enlargement factor of the projection lens or the type and color of the corresponding projection may be predefined. This results in elevated flexibility in regard to the projected information which is supplied to the individual passengers.

According to a further advantageous exemplary embodiment of the present invention, information which is selected from the group comprising static information, dynamic information, seat row information, seat information, warning information, prohibition information, flight information, escape route information, and entertainment information may be visualized through the light projected on the projection surface or may contribute to the design of the general illumination. For example, a sunrise, a starry sky, an airline logo, or even advertising may be projected.

An information display unit may therefore be provided which provides information to the passenger at a given instant in regard to an appropriate seat row in front of which he is currently located, or even information in regard to a specific seat which he is currently looking for. Furthermore, the information unit may provide warning information at a given instant, for example, in the form of a fasten seatbelts signal, or even show the way to the nearest emergency exit in case of an emergency situation. Furthermore, however, the information unit may project visual information to entertain the passengers, such as films or even simply relaxing patterns, shapes, and figures in different colors and movement sequences.

An extremely flexible, individually programmable, activatable, and operable information display system may thus be provided, which may react to corresponding requests and situations.

According to a further exemplary embodiment of the present invention, the information is integrated into a passenger seat or an interior furnishing of an aircraft cabin. Therefore, each individual passenger may be equipped with his own information unit which unobtrusively forms an integral component of his seat and therefore may not exert any disturbing visual, acoustic, or mechanical influence on the passenger. Furthermore, the information unit may be integrated into corresponding empty spaces in interior furnishings which would otherwise not be used.

According to a further exemplary embodiment of the present invention, the projection surface is at least partially light-transparent, the light transmitted through the projection means being projectable from the rear onto the projection surface.

It may therefore be possible, for example, to design a part of the surface of an interior furnishing, such as the surface of a ceiling element, as transparent and attach the projector to the interior of the ceiling element behind the transparent surface.

By arranging the projector behind the at least partially light-transparent projection surface, it is also ensured that the light beam is not influenced or blanked out by passengers or the like before being incident on the projection surface.

According to a further exemplary embodiment of the present invention, the light transmitted through the projection means is projectable onto the projection surface via a mirror. It is therefore possible to deflect the transmitted light beam accordingly via the mirror and project it on different projection surfaces which do not lie in the normal beam path of the transmitted light, by moving the mirror, for example.

Further objects, embodiments, and advantages of the present invention result from the subclaims.

SHORT DESCRIPTION OF THE FIGURES

In the following, the present invention will be described in greater detail on the basis of exemplary embodiments with reference to the drawing.

DETAILED DESCRIPTION OF EXEMPLARY EMBODIMENTS

In the following description of the figures, identical reference numbers are used for identical or similar elements.

Figure 1:
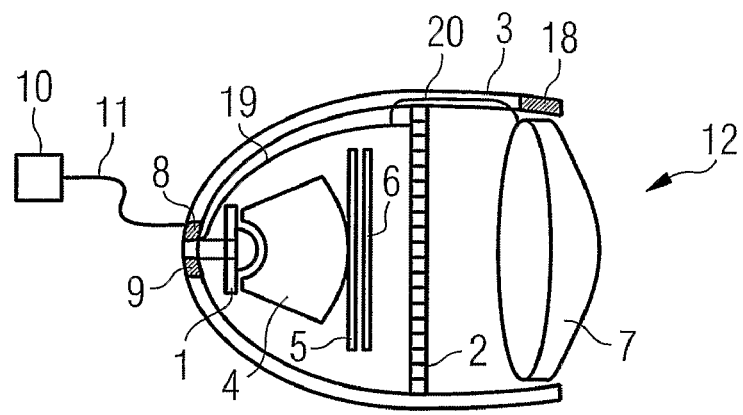
FIG. 1 shows a schematic sectional illustration through an information display system according to an exemplary embodiment of the present invention.

FIG. 1 shows a schematic sectional view of an information display unit according to an exemplary embodiment of the present invention. As may be inferred from FIG. 1, the information display unit has a projection unit 12, comprising a light source 1, an at least partially light-transparent projector 2, and a housing 3. The light source 1 is connectable via the power supply connection 9 to a corresponding power supply.

Furthermore, the information display unit has a projection objective 7 and a motor 18 for controlling the projection objective 7. Both motor 18 and projection means 2 are connected via corresponding data lines 19, 20 to a dataport 8, via which corresponding control units or data sources 10 may be connected using data line 11.

As may be seen in FIG. 1, the light source 1, which is a light-emitting diode having high luminous intensity (high-brightness LED), for example, is provided with a collimator lens 4 for collimating the light emitted from the light source. Furthermore, a diffuser 5 may be provided for the purpose of uniform distribution of the light emitted from the light source and a radiation filter 6 may be provided for filtering the light emitted from the light source.

The advantage of using light-emitting diodes having high luminous intensity is, for example, that light-emitting diodes of this type are distinguished by an extremely compact construction and high resistance, as well as low energy consumption. For the information display system according to the present invention, this means a construction which is extremely weight-saving and space-saving and a low maintenance outlay. Of course, however, other light sources are also conceivable, such as corresponding high-performance incandescent lamps, gas discharge lamps, fluorescent tubes, and the like.

An external power supply for the light source 1 is connectable to the unit via the power supply connection 9. Of course, it is also conceivable for the projection means 2 to be supplied with power via the supply connection 9 (if the projector 2 requires power at all). Of course, it is also conceivable for the light source 1 and also possibly the projector 2 to be supplied with power from an internal power source (not shown in FIG. 1) located in the housing 3.

The collimator lens 4 is essentially used for the purpose of producing a collimated beam bundle, so that the display 2 is illuminated uniformly. Manifold variations are conceivable here, for example, light-emitting diode and collimator lens may be permanently connected to one another, so that a maximum light yield is made possible. A downstream diffuser 5 (headlight lens) is used for uniform distribution of the collimated light. According to the exemplary embodiment of the present invention illustrated in FIG. 1, a radiation filter 6 for filtering the light emitted from the light source is connected downstream or upstream from the diffuser 5. The filter may be set in such a way that only a specific wavelength is transmitted, for example. Therefore, a selection may advantageously be made, through which the physical properties, such as the wavelength, of the light incident on the display 2 may be determined.

Diffuser 5 and filter 6 may, of course, be connected to one another. For example, the filter may be applied to the diffuser in the form of a film or the diffuser itself may be colored.

The projector 2 may, for example, a thin film or an appropriately printed or otherwise processed disk or another type of partially light-transparent medium. Furthermore, however, particularly for the case that dynamic information or varied information is to be presented, it may be an electronically programmable or changeable projection means, such as a liquid crystal display. The electronically changeable projector 2 is connected for this purpose via a data line 19 to a dataport 8, which is activatable and operable via an externally positioned control unit 10 using data line 11. The data which is output from the control unit 10 to the projector 2 may be image data or film data, for example. Therefore, complete films may be imaged on the projection surface (not shown in FIG. 1).

Furthermore, it is conceivable that control signals are output from the control unit 10 to the motor 18, via which the projection objective 7 may then be set appropriately, so that the projected image has a corresponding size or sharpness. The projection objective 7 may, for example, be a lens system, which, similarly to a reflex camera objective, may be exchanged as needed. Of course, to save production costs and weight, it may also be a permanently integrated lens system, which may be moved toward or away from the projector 2 not via a motor 18, but rather by hand, for example, so that the projected image may be set sharply on the projection surface. Furthermore, different lenses having fixed focal lengths may be provided for specific projection distances, which may not be adjustable.

Figure 2:
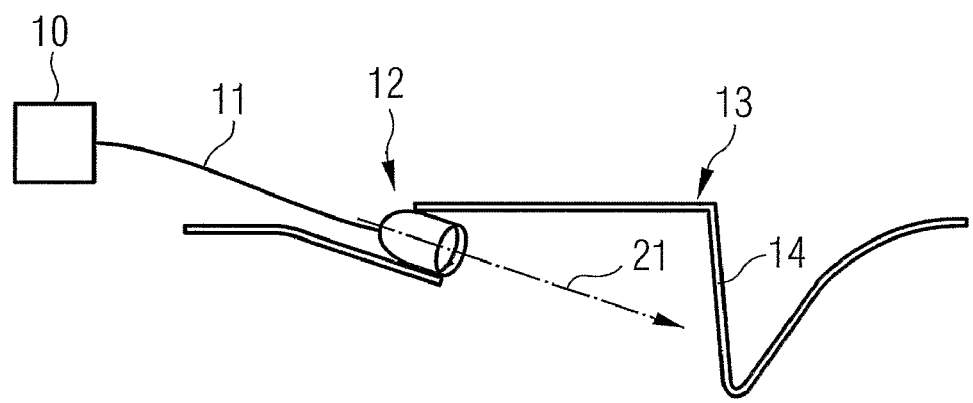
FIG. 2 shows a schematic illustration of an information display system according to a further exemplary embodiment of the present invention.

FIG. 2 shows a schematic illustration of an information display system for aircraft according to a further exemplary embodiment of the present invention. The projector 12, as is shown in FIG. 2, is integrated into an interior furnishing 13 and connected via data line 11 to a control unit 10. The control unit 10 may be housed for this purpose in a central control console (not shown in FIG. 2), which is positioned in the direct influence range of the onboard personnel, or even, at least partially, in the cockpit. It is thus possible for the pilots to transmit optical information directly from the cockpit to the appropriate passengers.

The mini-projector unit 12 projects the optical information 21 on the projection surface 14, which forms a part of a ceiling element or a storage space for hand luggage. The projection surface 14 may be implemented as white, but may also, of course, be a normal plastic or light metal surface, as is typical in onboard operation. However, many other materials are also conceivable, of course. A surface having good reflective properties is advantageous.

Figure 3:
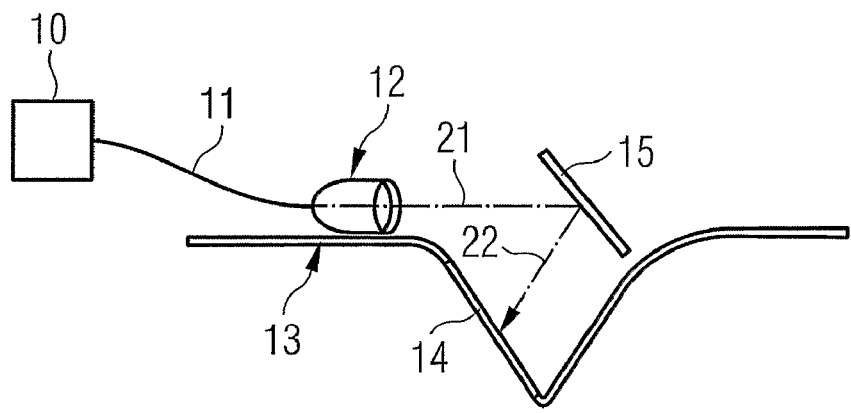
FIG. 3 shows a schematic illustration of an information display system according to a further exemplary embodiment of the present invention.

FIG. 3 shows a schematic illustration of an information display system in an aircraft according to a further exemplary embodiment of the present invention. In this case, the projector unit 12, which is connected via data line 11 to an external control unit 10, is installed behind a ceiling element 13 and/or within an interior furnishing. The projection of the optical signal is performed for this purpose via the detour of a deflection mirror 15 onto the projection surface 14. The projection surface 14 is an at least partially light-transparent material for this purpose, so that the optical signal projected onto the projection surface 14 at least partially passes through the projection surface 14 and is visible from the other side. The projector unit 12 is therefore completely invisible to the passenger and the light path (illustrated by lines 21, 22) is largely projected.

The data line 11 is, for example, a data cable. However, wireless data transmission is also conceivable, of course, as it is used in the field of mobile communication, for example.

Figure 4:
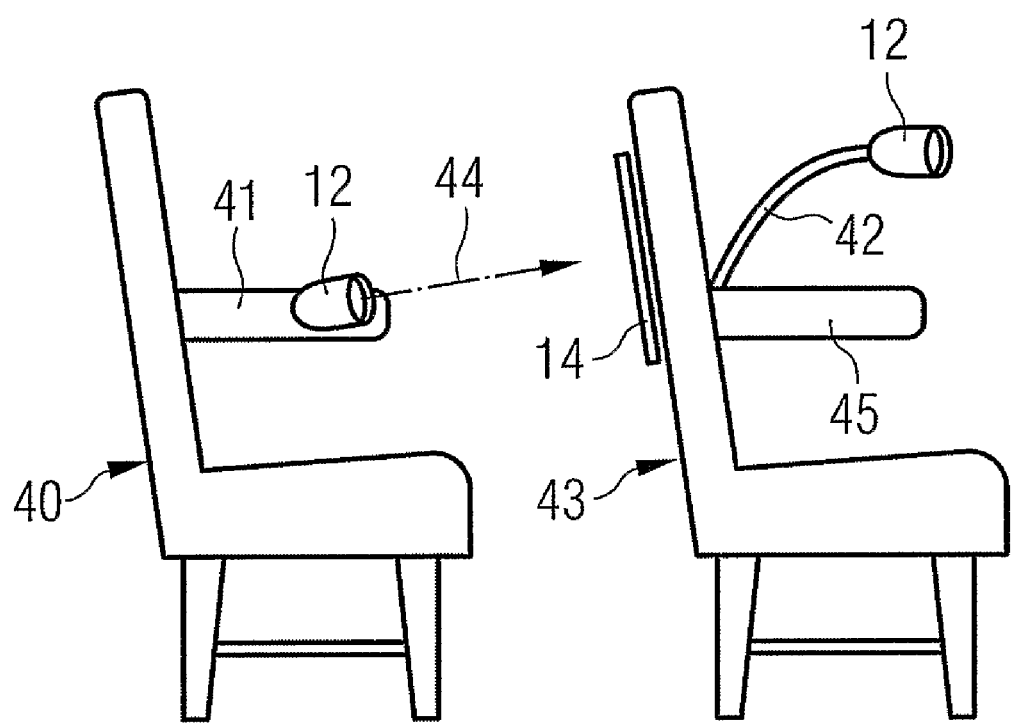
FIG. 4 shows a further schematic illustration of an information display system according to a exemplary embodiment of the present invention.

FIG. 4 shows a schematic illustration of an information display system according to a further exemplary embodiment of the present invention. The projector unit 12 is installed here in the armrest 41 of a passenger seat 40, for example. By changing the position of the armrest 41, each passenger may thus individually determine the projection direction of the projector unit 12 (illustrated by arrow 44), for example. The projected image may thus, for example, be projected onto the projection surface 14. However, it is also conceivable for the image to be projected onto the ceiling of the cabin by folding up the armrest 41.

Furthermore, it is conceivable for the passenger to perform the corresponding sharpness setting individually via projection objective 7 (illustrated in FIG. 1). Furthermore, it is conceivable for a projector unit 12 to be attached to the passenger seat 43 in the form of a gooseneck arrangement 42. Individual setting of the projection direction is therefore possible independently of the position of the armrest 45. It is also conceivable in this way for the passenger to select a projection direction perpendicular to the image plane of FIG. 4, for example, i.e., in the direction of a side wall of the cabin, for example.

The information which is projected onto the projection surface for this purpose may be of a greatly varying nature. For example, it is conceivable to image static information, for example, in the form of no smoking signs or requests to fasten seatbelts or the like. Information in regard to the appropriate seat row or the appropriate seat or even escape route information may also be imaged here. In the escape route information, for example, arrows which point in the direction of the nearest possible emergency exit are conceivable. Of course, however, dynamic information is also conceivable, such as entertainment films or visual stimuli which encourage well-being. However, even information which relates to technical matters may also be displayed individually, of course. This may be the current airspeed, the current altitude, the distance to the destination, the external temperature, or even the current temperature at the destination. It would be conceivable here that the control unit 10 illustrated in FIG. 2 is implemented as an individual control unit, for example, which is also integrated into the passenger seat, and has a corresponding data memory, so that the passenger may individually select all information which he requires.

Figure 5:
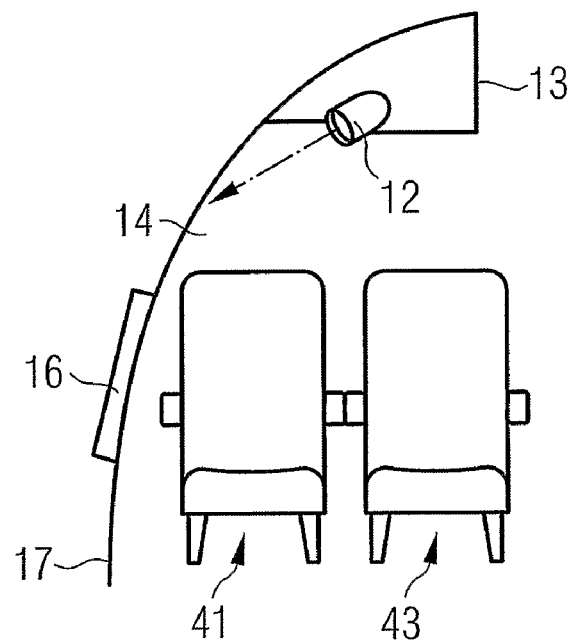
FIG. 5 shows a schematic illustration of an information display system according to a further exemplary embodiment of the present invention.

FIG. 5 shows a schematic illustration of an information display system according to a further exemplary embodiment of the present invention. In this case, the mini-projector unit 12 is integrated into a ceiling element 13 and projects the optical information onto the projection surface 14, which forms a part of the aircraft wall 17 and is positioned above the window 16. For this purpose, projector unit 12 may be a centrally controlled projector which emits information for both passengers located in the passenger seats 41, 43. Of course, individual projectors may also be integrated into the individual passenger seats 41, 43 (not shown in FIG. 5).

Figure 6:
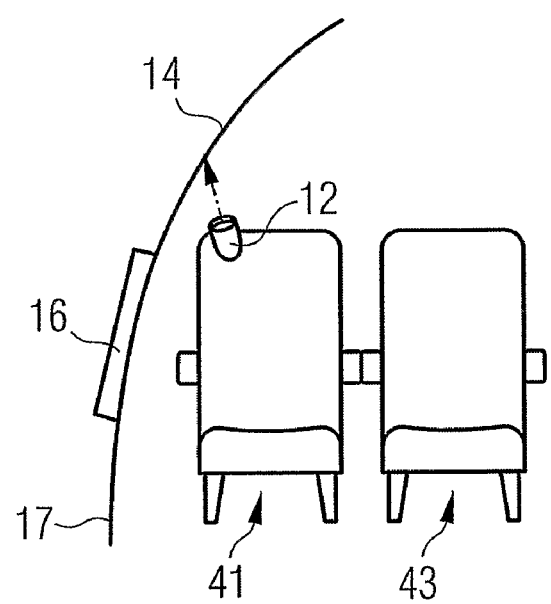
FIG. 6 shows a schematic illustration of an information display system according to a further exemplary embodiment of the present invention.

FIG. 6 shows a schematic illustration of an information display system according to a further exemplary embodiment of the present invention. In this case, the projector unit 12 is integrated into the backrest of the passenger seat 41 and projects the visual information onto the projection surface 14 over the window region 16 of the wall 17.

Through the information display system according to the present invention, not only may simple information displays be presented, which merely project an image, slide, pictogram, or writing continuously onto a surface, but rather also dynamic information displays may be presented, which may be changed by projecting a mini-display of images or writing. Furthermore, projectors which are usable to entertain the passengers via a video input may advantageously be used.

It is therefore possible to provide temporary displays which reproduce information in regard to a specific seat row, for example. For this purpose, it is conceivable that the number at a specific seat row is projected on the wall the cabin and therefore finding the seat is made significantly easier upon boarding, since the number may be presented correspondingly large and easily visible from the aisle. The seat number may also be projected directly onto the seat, e.g., onto the seat surface. The seat number may advantageously be turned off after completing the boarding procedure, so that it disappears without a trace.

Furthermore, through corresponding projections, colored accents may be placed which make it easier to find the seat upon boarding. It is also conceivable to individually specify the direction to the nearest exit, tailored to the actually existing emergency situation, through changeable arrows.

Therefore, well-visible information may be produced through the projection which is changeable as desired. After being turned off, these displays are invisible. Furthermore, information may even be projected onto surfaces on which installation of a display is impossible or undesirable. The size of the projected information and/or the distance to the projection surface may advantageously be changed through different projection objectives and/or different projection objective settings.

The embodiments of the present invention are not restricted to the preferred embodiments illustrated in the figures. Rather, manifold variations are conceivable, which make use of the achievement of the object shown and the principle according to the present invention, even if the embodiments are of a significantly different type.

It is also to be noted that "comprising" does not exclude other elements or steps and "a" or "an" does not exclude a plurality. Furthermore, it is to be noted that features or steps which were described with reference to one of the exemplary embodiments above may also be used in combination with other features or steps of other exemplary embodiments described above. Reference signs in the claims shall not be construed as limiting the scope of the claims.

The invention claimed is:

1. An information display unit for an aircraft for displaying information, the information display unit comprising:
   a housing a light source including a light-emitting diode and the light source is located within the housing;
   an at least partially light-transparent projector installed behind a ceiling element or integrated into an interior furnishing of an aircraft cabin so that the projector is invisible to a passenger;
   the light source being positioned behind the projector within the housing and at least partially shining through the projector; and
   a projection surface formed as a part of the ceiling element of a storage compartment of the aircraft cabin, the projection surface having a projection side and a side opposite to the projection side, a light transmitted through the projector being projectable onto the projection side of the projection surface, the projection surface further being at least partially light-transparent so that the light projected from the projector is visible to the passenger at the side opposite to the projection side of the projection surface.

2. The information display unit of claim 1, wherein the projector comprises a liquid crystal display.

3. The information display unit of claim 1, wherein the projector comprises:
   at least one component selected from the group consisting of a collimator, a diffuser, a radiation filter, and a projection lens.

4. The information display unit of claim 1, further comprising a dataport operable to activate the information display unit from the outside.

5. The information display unit of claim 4, wherein the dataport is configured to transfer projection data to the information display unit via the dataport; such that the projection of the transmitted light onto the projection surface is controllable via the transferred projection data.

6. The information display unit of claim 1, wherein information selected from the group consisting of static information, dynamic information, seat row information, seat information, warning information, prohibition information, flight information, escape route information, and entertainment information is visualized through the light projected onto the projection surface.

7. The information display unit of claim 1, further comprising a mirror configured by the light transmitted through the projector being projectable via the mirror onto the projection surface.

8. An aircraft, comprising an information system of claim 1.

9. The information display unit of claim 2, also comprising: at least one component selected from the group consisting of a collimator, a diffuser, a radiation filter, and a projection lens.

10. The information display unit of claim 2, further comprising a dataport operable to activate the information display unit from the outside.

11. The information display unit of claim 3, further comprising a dataport operable to activate the information display unit from the outside.

12. The information display unit of claim 5, wherein information selected from the group consisting of static information, dynamic information, seat row information, seat information, warning information, prohibition information, flight information, escape route information, and entertainment information is visualized through the light projected onto the projection surface.

13. An aircraft, comprising an information system of claim 7.

* * * * *